United States Patent [19]

Baker

[11] 4,287,670

[45] Sep. 8, 1981

[54] FILAMENT-TYPE TRIMMER

[75] Inventor: Larry R. Baker, Dallas, N.C.

[73] Assignee: Textron, Inc., Providence, R.I.

[21] Appl. No.: 929,026

[22] Filed: Jul. 28, 1978

[51] Int. Cl.³ .......................................... A01D 50/00
[52] U.S. Cl. ...................................... 30/276; 56/12.7
[58] Field of Search .................... 30/276, 347; 56/12.7

[56] References Cited

U.S. PATENT DOCUMENTS

| | | | |
|---|---|---|---|
| 3,664,102 | 5/1972 | Reber | 56/295 |
| 4,077,191 | 3/1978 | Pittinger | 30/276 |
| 4,091,536 | 5/1978 | Bartholomew | 30/276 |
| 4,091,538 | 5/1978 | Akiyama | 30/276 |
| 4,104,796 | 8/1978 | Sheldon | 30/276 |
| 4,138,810 | 2/1979 | Pittinger | 30/276 |
| 4,176,508 | 12/1979 | Baumann | 56/12.7 |

Primary Examiner—Jimmy C. Peters
Attorney, Agent, or Firm—Robert E. Burns; Emmanuel J. Lobato; Bruce L. Adams

[57] ABSTRACT

In a filament type trimmer in which a filament is wound on a storage spool rotatably mounted in a rotating housing having a rim portion, the filament in passing from the spool to an exit opening in the rim portion of the housing extends through a flexible tubular guide which wraps approximately one turn around the spool. The guide prevents the outer coils on the spool from becoming entangled and also prevents local melting and welding of the outer coils as the result of axial vibration in the string during operation of the trimmer.

9 Claims, 3 Drawing Figures

FILAMENT-TYPE TRIMMER

FIELD OF INVENTION

The present invention relates to filament type trimmers and in particular to control of the filament in the rotating head of such trimmers.

BACKGROUND OF THE INVENTION

In a filament type trimmer having a filament storage spool mounted in a rotating housing having a rim portion with an exit aperture through which the filament extends, problems have been found to arise as the result of axial vibration of the filament when the trimmer is running. Such vibration has been found to create rubbing friction between outer turns of filament on the storage spool and the portion of the filament which leaves the spool tangentially and extends to the exit aperture in the rim of the housing. This friction produces heat which may be sufficient to melt the filament locally and produce welding of the filament to itself. This inhibits unwinding of the filament from the storage spool to provide filament advance for replacement of end portions of the filament as they are worn or broken off.

It has also been found that owing to vibration, the outer coils of filament on the spool tend to become entangled with themselves and with inner coils. This likewise interferes with unwinding of filament from the spool to provide filament advance.

SUMMARY OF THE INVENTION

It is an object of the present invention to overcome these problems and difficulties in a simple yet highly effective manner. In accordance with the invention, the filament in passing from the storage spool to the exit aperture in the rim of the rotating housing, extends through a flexible guide tube which partially wraps around the storage spool extends tangentially from the storage spool to the exit aperture in the rim of the housing. The guide tube prevents the filament from rubbing on itself by reason of axial vibration in the string and thereby prevents local melting of the filament and the welding of the filament to outer turns on the spool. Moreover, the guide tube preferably wraps around the spool at least approximately one complete revolution so as to assist in keeping the outer coils of the filament on the spool tight and preventing entanglement of the filament.

BRIEF DESCRIPTION OF DRAWINGS

The nature, objects and advantages of the invention will be more fully understood from the following description of a preferred embodiment shown by way of example in the accompanying drawings in which.

DESCRIPTION OF PREFERRED EMBODIMENT

Figure 1:
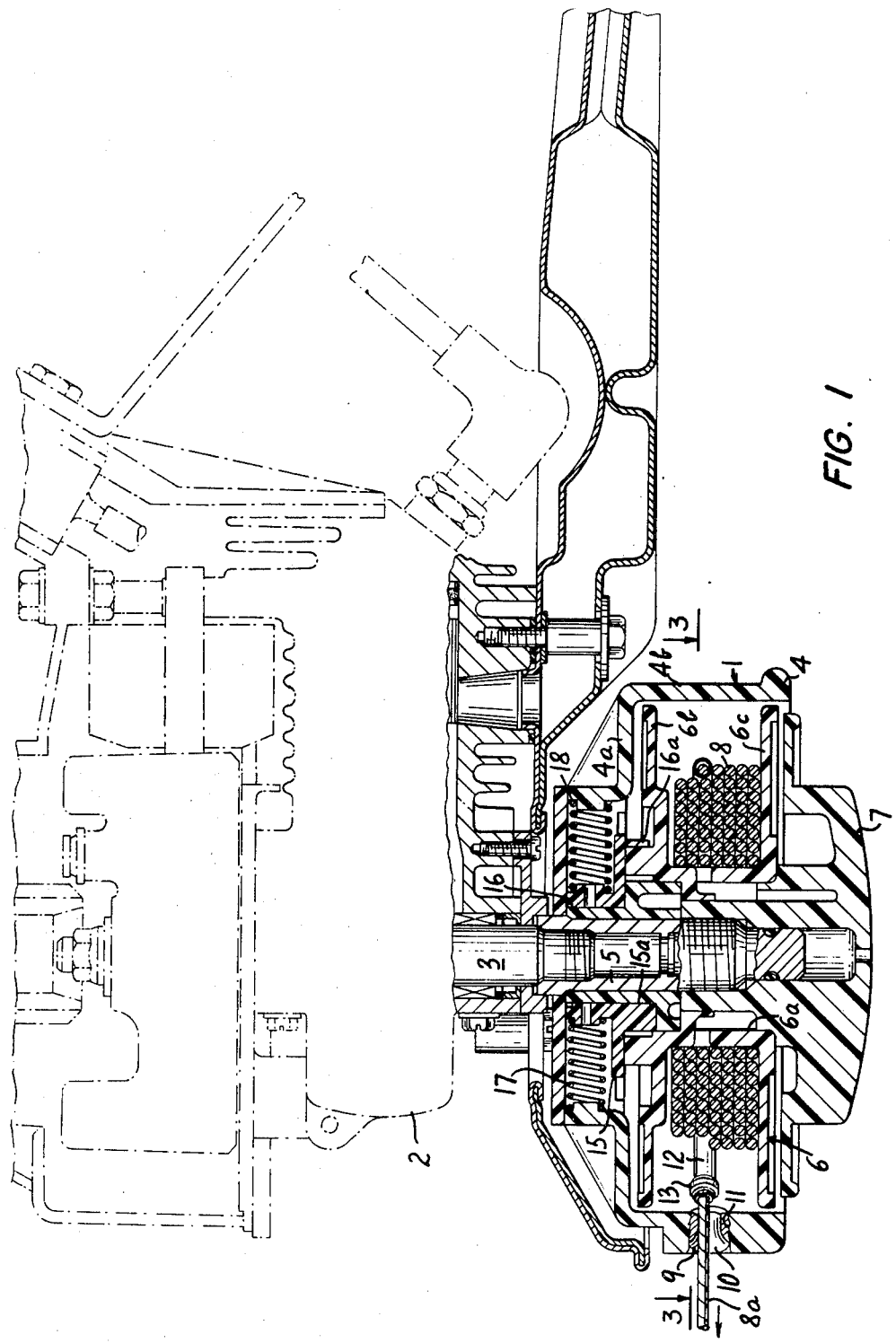
FIG. 1 is a vertical sectional view through the rotating housing and adjacent portion of a filament type trimmer in accordance with the present invention, the motor by which the housing is rotated being shown schematically in phantom.

A filament type trimmer in accordance with the present invention is illustrated by way of example in the drawings as comprising a rotary cutting head 1 driven by a motor 2 shown schematically by way of example as a single cylinder two-stroke cycle internal combustion engine having a drive shaft 3. The cutting head 1 is shown as comprising a circular housing 4 having a base portion 4a and a downwardly extending rim portion 4b. The housing 4 is conveniently molded of plastic material and is removably secured to the motor by an internally threaded metal bushing 5 which is screwed onto a threaded portion of the motor drive shaft 3. A filament storage spool 6 having a hub portion 6a and opposite flange portions 6b and 6c is rotatably mounted coaxially in the housing and is retained by a removable cap 7 having an internally threaded central hub portion which screws onto a threaded end portion of the bushing 5.

Figure 3:
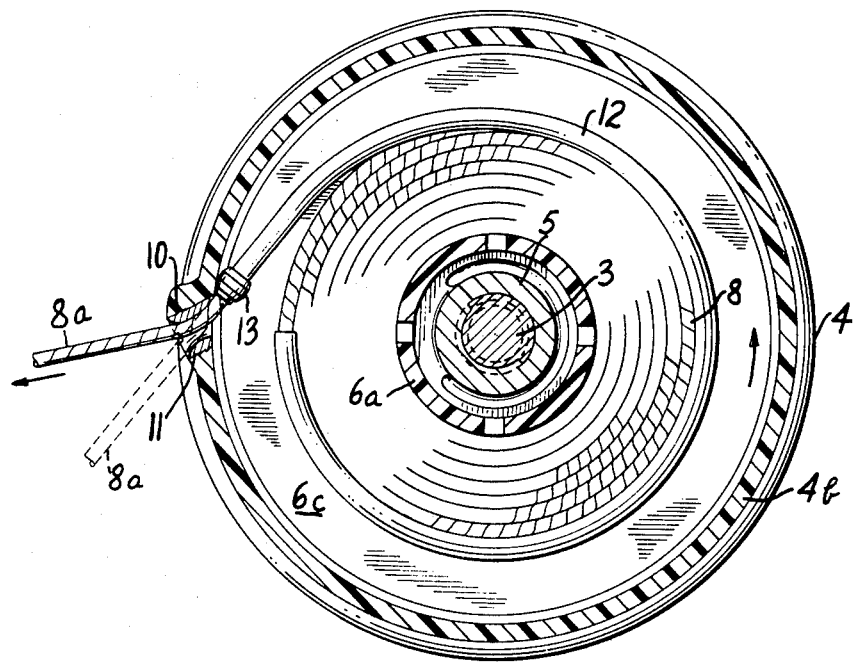
FIG. 3 is a horizontal section taken approximately on the line 3—3 in FIG. 1.

A filament 8 is wound on the spool 6 and an inner end of the filament is secured to the hub portion of the spool. The filament 8 is, for example, a monofilament of thermal plastic material selected for the characteristics of strength, toughness and abrasion resistance. An outer end portion 8a of the filament extends out through an exit opening 9 provided in the rim portion 4b of the rotating housing 4. The exit opening is shown as comprising a bushing 10 set in an opening 11 in the rim portion 4b of the rotating housing 4. The bushing 10 is of hard abrasion resistant material having a low coefficient of friction with respect to the filament 8. For example the bushing 10 may be of metal such as brass or stainless steel or it may be a hard abrasion resistant plastic. It is set firmly in the opening 11 in the rim of the housing, for example by ultrasonic welding. As seen in FIG. 3, the bushing 10 is set with its axis inclined rearwardly with respect to a radius of the housing 4 which passes through the bushing. The angle of inclination is for example about 30 to 45 degrees. When running free, the filament extends approximately radially from the housing as shown in solid lines in FIG. 3 and bears on the front of the bushing which has a smooth rounded surface so as to reduce friction with the filament. When the filament strikes an obstacle, it is deflected rearwardly as shown in dotted lines and does not bear on the bushing but passes straight through the opening from the spool.

Figure 2:
FIG. 2 is a side view of a guide tube for the filament before the tube is bent.

In accordance with the invention a portion 8b of the filament which extends from the spool to the exit opening 9 passes through a guide tube 12. The tube 12 is for example a tube of dead-soft aluminum which is originally a straight piece of tubing as shown in FIG. 2. The tubing has an internal diameter slightly larger than the diameter of the filament 8 so that the filament can be readily threaded through it. Before the spool 6 with the filament wound thereon is placed in the housing, 4 an outer end portion of the filament is threaded through the tube 12 and the tube is thereupon bent in the form shown in FIG. 3 so that it is wrapped partially around the spool and extends tangentially from the spool to the exit opening 9 when the spool is placed in the housing. Preferably the guide tube 12 is of such length that with a full spool it wraps approximately once around the spool as illustrated in FIG. 3. The outer end of the guide tube 12 is enlarged for example by fixing thereon a ferrule 13 so that it cannot pass out through the exit opening in the rim portion of the rotating housing. The guide tube 12 is sufficiently flexible that as the filament is used-up, the pull of centrifugal force on the filament is sufficient to bend the tube and make it conform substantially to the outer coils of filament on the spool except for the tangential portion that extends to the exit opening 9. It has been found that the guide tube 12 avoids frictional rubbing of the outermost coil of filament on the spool with adjacent coils and thereby avoids melting of the filament and welding of the filament to itself. Moreover, as the guide tube hugs the spool, it prevents entanglement of one coil of filament with another.

Instead of being formed of soft aluminum tubing, the guide tube 12 may be of other material which provides appropriate flexibility. For example the tubing may be formed of coiled wire with closely positioned successive convolutions. Instead of being seamless the tubing may be split along its outer periphery to facilitate the threading of the filament through it. The heat conductivity of the tube contributes to avoiding welding.

The spool 6 is normally locked with respect to the housing 4 so as to rotate with the housing. However, means is provided for releasing the spool from time-to-time to permit a portion of the filament to be unwound from it by the pull of centrifugal force on the outer end portion 8a of the filament. In the embodiment illustrated by way of example in FIG. 1., rotation of the filament spool 6 relative to the housing 4 is controlled by mechanism such as that disclosed in John D. Sheldon U.S. Pat. No. 4,104,796. As illustrated in FIG. 1, this mechanism comprises a low speed slider 15 and a high speed slider 16. The sliders 15 and 16 are slidable in radially extending slots in the base portion 4a of the housing 4 immediately above the filament spool 6. The sliders 15 and 16 are biased radially inwardly by coil springs 17 and 18 respectively. By reason of rotation of the housing 4, centrifugal force acts on the sliders 15 and 16 so as to move them radially outwardly against the bias of the respective springs at predetermined speeds of rotation. The springs 17 and 18 are calibrated with respect to the weights of the respective sliders so as to determine the rotational speed of the housing at which the sliders move outwardly by centrifugal force. The spring 18 of the slider 16 is stronger relative to the weight of the slider than the spring 17 of slider 15 so that the low speed slider 15 will move radially outwardly at a lower speed than the high speed slider 16.

The low speed slider 15 is provided with a downwardly extending projection 15a which in the outer position of the slider is engageable with one or another of upwardly extending projections 19 provided on the upper flange 6b of the filament spool 6. The projections 19 are arranged in a circle concentric with the axis of the spool and are spaced circumferentially. For example three or four such projections may be provided on the spool. The high speed slider 16 is similarly provided with a downwardly extending projection 16a which in the inner position of the slider is engageable with one or another of the projections 19 on the spool. By way of example the springs 17 or 18 are calibrated so that when the cutting head 1 is rotating at a speed below 3000 rpm both sliders are in their inner position at 3000 to 9000 rpm the lower speed slider 15 has moved to its outer position while the high speed slider 16 is still in its inner position and above 9000 rpm both sliders are in their outer position. It will be understood that different speeds can be selected by suitable calibration of the springs with respect to the weights of the sliders. When the cutting head 1 is rotating at a normal operating speed, for example within the range of 3000 to 9000 rpm, the projection 16a of the high speed slider 16 engages one of the projections 19 on the filament spool so as to hold the spool against rotation relative to the casing. If the speed of rotation of the cutting head 1 increases above 9000 rpm (by reason of the projecting end portion 8a of the filament having become shorter and thereby reducing the load on the motor 2) the high speed slider 16 moves outwardly against the bias of its spring so as to disengage the respective projection 19 on the spool, thereby permitting the spool to be rotated by the pull of centrifugal force on the filament so as to unwind filament from the spool. However, the projection 15a of the low speed slider is in the path of travel of the projections 19 on the spool 6 so that the spool is permitted to rotate only until another of the projections on the spool engages the projection 15a of the low speed slider 15. Further rotation of the filament spool relative to the cutting head is delayed until, for example by manual control of the motor, the speed of rotation of the cutting head is reduced to a speed below 3000 rpm, for example idling speed. Both of the sliders 15 and 16 are thereupon moved to their inner positions by the bias of the respective springs whereupon the projection 15a of the low speed slider is disengaged from the respective projection on the spool thereby permitting the spool to rotate until the next projection on the spool engages the projection 16a of the high speed slider 16. This delay in feeding additional filament avoids sudden increase in the length of the filament and corresponding increase in the cutting radius of the trimmer while the cutting head is rotating at high speed. Hence if the user is trimming close to a flower bed, possible damage to the flowers is avoided. As a trimmer of this kind is usually operated for only short periods of time between idling periods, the cycle of operation described above for restoring the normal length of the projecting end portion of the filament occurs automatically and without any special attention on the part of the operator.

As the guide tube 12 provided in accordance with the present invention prevents the welding of the filament to itself by reason of rubbing friction resulting from axial vibration of the filament and also avoids entanglement of coils of filament on the spool with one another, the filament unwinds freely from the spool when the spool is released for rotation, for example by automatic control means such as that disclosed in said U.S. Pat. No. 4,104,796 and described briefly above. Thus if the length of the projecting end of the filament is reduced by the filament breaking or wearing off, the reduced load on the engine results in an increase of engine speed whereupon the sliders 15 and 16 are actuated as described above to permit incremental rotation of the spool 16 and thereby feed-out more filament to restore the normal length of the projecting portion 8a.

While a preferred embodiment of the invention is illustrated in the drawings and has been herein described, it will be understood that variations and modifications may be made and that the invention is hence is no way limited to the illustrated embodiment.

What is claimed is:

1. In a filament-type trimmer, the combination of a rotatable housing having a rim portion, a filament storage spool rotatably mounted in said housing, a filament wound on said spool, exit means in said rim portion of the housing through which an end portion of said filament extends in passing from said spool to the exterior of the housing, and flexible tubular guide means through which said filament extends in passing from said spool to said exit means.

2. A combination according to claim 1, in which said guide means comprises a flexible tube which is bent at least partially around said spool.

3. A combination according to claim 2, in which said flexible tube extends at least approximately one revolution around said spool.

4. A combination according to claim 1, in which said exit means comprises an aperture in said rim portion of the housing and in which said flexible tube has an enlarged outer end portion of a size to prevent said tube from passing through said aperture.

5. A combination according to claim 2, in which said flexible tube is of soft aluminum.

6. A combination according to claim 2, in which said flexible tube has an inside diameter slightly larger than the diameter of said filament so that said filament runs freely through said tube.

7. A combination according to claim 1, in which said exit means comprises an eyelet in said rim portion of said housing, said eyelet having an axis that is inclined sufficiently rearwardly of a radius of said housing passing through said eyelet that when as end portion of said filament extending from said housing is running free it bears on a front portion of said eyelet and when said filament strikes an object it does not bear on said eyelet.

8. A combination according to claim 7, in which the axis of said eyelet is inclined rearwardly at an angle of approximately 30° to said radius.

9. A combination according to claim 7, in which said rim portion of said housing is of plastic material and said eyelet comprises a bushing of hard smooth material set in an aperture of said rim portion.

* * * * *